United States Patent [19]
Mantell

[11] Patent Number: 5,835,238
[45] Date of Patent: Nov. 10, 1998

[54] PHANTOM LEVEL EDGE ENHANCED ERROR DIFFUSION

[75] Inventor: David A. Mantell, Rochester, N.Y.

[73] Assignee: Xerox Corporation, Stamford, Conn.

[21] Appl. No.: 672,192

[22] Filed: Jun. 27, 1996

[51] Int. Cl.$^6$ ................. H04N 1/40; G06K 9/40
[52] U.S. Cl. ............ 358/458; 358/456; 382/252; 382/266
[58] Field of Search ................. 358/456, 455, 358/457, 465, 466, 448, 458, 534, 443, 447, 524, 523, 530, 532, 533; 382/252, 251, 232, 270, 254, 266, 269; 370/200

[56] References Cited

U.S. PATENT DOCUMENTS

| | | | |
|---|---|---|---|
| 5,045,952 | 9/1991 | Eschbach | 358/447 |
| 5,226,096 | 7/1993 | Fan | 382/252 |
| 5,243,443 | 9/1993 | Eschbach | 358/455 |
| 5,268,774 | 12/1993 | Eschbach | 358/466 |
| 5,321,525 | 6/1994 | Hains | 358/457 |
| 5,353,127 | 10/1994 | Shiau et al. | 358/458 |
| 5,375,002 | 12/1994 | Kim et al. | 358/521 |
| 5,434,672 | 7/1995 | McGuire | 358/296 |
| 5,454,052 | 9/1995 | Kojima | 358/456 |

OTHER PUBLICATIONS

Floyd, Robert W. and Steinberg, Louis, "An Adaptive Algorithm for Spatial Greyscale".
Eschbach, R. & Hanck, R., "Analytic Description of the 1–D Error Diffusion Technique for Halftoning" *Optics Communications*, vol. 52, No. 3, Dec. 1, 1984, pp. 165–168.
Knox, Keith T. and Eschbach, Reiner, "Threshold Modulation in Error Diffusion," Reprint from *Journal of Electronic Imaging*, Jul. 1993, pp. 185–192.
Kim, Jae Ho, et al., "New edge–enhanced error diffusion algorithm based on the error sum criterion", *Journal of Electronic Imaging*, Apr. 1995, vol. 4(2), pp. 172–178.

*Primary Examiner*—Kim Yen Vu
*Assistant Examiner*—Madeleine A. V. Nguyen
*Attorney, Agent, or Firm*—Daniel J. Krieger

[57] ABSTRACT

A method and apparatus for converting an input image including a plurality of input pixels each having a number of possible input levels of optical density to an output image including a plurality of output pixels each having a number of possible output levels of optical density using phantom output levels in an error diffusion technique, an automatic image enhancement technique, or other printing methods and apparatus where errors are fed back to alter an input image. The method includes generating a modified optical density value by adding an error value, if any, to the input level of one of the input pixels, generating a phantom output level as a function of the modified optical density level, determining the error value as a function of the selected phantom output level; and generating an output pixel having one of the output levels determined as a function of the modified optical density value.

23 Claims, 6 Drawing Sheets

PHANTOM LEVEL EDGE ENHANCED ERROR DIFFUSION

FIELD OF THE INVENTION

This invention relates generally to quanitization or halftoning in color or monochrome documents and more particularly to the use of phantom levels in edge enhanced error diffusion for such documents.

BACKGROUND OF THE INVENTION

The representation of continuous tone pictorial data in a binary or multilevel format is a major concern as the need increases to transmit and display images. The binary representation or multilevel representation of continuous tone image information is desired in order to reduce the sensitivity to noise in transmission and storage of the image information or to enable the accurate depiction of continuous tone originals with binary or multilevel media.

In the general field of digital halftoning, different methods exist to convert continuous tone images to binary images in such a manner as to preserve the appearance of tonal gradations similar to the original image. In the digital reproduction of documents, a color separation which provides varying densities of a single primary color is combined with other separations to produce a full color image. The color separation is conveniently represented as a monochromatic bitmap, which may be described as an electronic image with discrete signals (hereinafter, "pixels") defined by a position and a density. In such a system, density is described as one level in a number of possible states or levels. When more than two levels of density are used in the description of the image, the levels are often termed "gray" indicating that they vary between a maximum and a minimum, and without reference to their actual color. Most printing systems have the ability to reproduce an image with a small number of levels, most commonly two, although other numbers of levels are possible. For instance, ink jet printers typically operate with two levels while acoustic ink jet printers can operate with more than two levels.

Printing systems or display systems receive information from known input devices including document scanners, digital cameras, and computer imagery generators. These common input devices are, however, capable of describing an image with a substantially larger number of gray levels, for instance, 256 levels being a commonly selected number, although larger and smaller levels are possible. Consequently, it is necessary that an image initially described with a large set of levels be describable with a smaller set of levels in a manner which captures the information of the original image and which is satisfactory to the ultimate user. Usually in digital reproduction of color documents, this means that each of the color separations is reduced from the input number of levels to a smaller output number of levels. The multiple color separations are combined together at printing to yield the final color print. Commonly, color documents are formed using cyan, magenta, and yellow colorants or cyan, magenta, yellow and black colorants. A larger number or alternative colorants may also be used.

In printing or displaying an image, the desired density of color over an area is commonly achieved by halftoning where separation density variation is represented by placing greater or less numbers of ON pixels in a discrete area of the separation. In one halftoning method known as dithering or screening, over a given area having a number of gray separation pixels therein, a value representing the density of each separation pixel of an array of gray separation pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. The effect of such an arrangement is that for an area where the image is gray, some of the thresholds within the dither matrix will be exceeded i.e. the image value at that specific location is larger than the value stored in the dither matrix for that same location, while others are not. In the binary case, the separation pixels or cell elements for which the thresholds are exceeded might be printed as a maximum colorant value while the remaining separation pixels are allowed to remain white, or not printed, dependent on the actual physical quantity described by the data. The described halftoning method produces an output pattern that is periodic or quasi-periodic in the spatial coordinates.

Error diffusion is another halftoning method and is taught in "An Adaptive Algorithm For Spatial Gray Scale" by Floyd and Steinberg, proceedings of the SID 17/2, 75 to 77 (1976). Another, more elaborate method, is the error diffusion techniques of U.S. Pat. No. 5,045,952 to Eschbach, which provides image dependent edge enhancement, assigned to the same assignee as the present invention. In addition, U.S. Pat. No. 5,353,127 to Shiau describes error diffusion using various schemes for distribution weightings of error and is herein incorporated by reference. Error diffusion attempts to accurately reproduce gray by making a conversion from gray pixels to binary or multilevel pixels on a pixel-by-pixel basis. Error diffusion examines each pixel with respect to a threshold, and the difference between the gray level pixel value and the output value is forwarded to a selected group or set of neighboring pixels in accordance with a weighting scheme. The output binary pattern of the error diffusion algorithm and its derivatives provides a pattern with a local periodicity related to the input level but with no global periodicity.

See "Analytic Description of the 1-D Error Diffusion Technique for Halftoning," Optics Communications, Volume 52, No. 3, 165–168 (1984) by R. Eschbach and R. Hauck.

Dithering creates problems in color document reproduction where the repeating pattern of the screen throughout the image when superimposed over similar repeating patterns in multiple separations can cause moiréor other artifacts, particularly in printing systems with less than ideal registration between separations.

Error diffusion, on the other hand, operates on a pixel-by-pixel basis and is therefore non-periodic which tends to reduce the problems of moiré. Since error diffusion is a deterministic process, however, registration of the different deterministic color separations can lead to a color shift. Such a color shift can be reduced by introducing a random element into the error diffusion process but at the expense of image noise. In addition, while the Eschbach algorithm providing image dependent edge enhancement can improve the reproduction of edges in an image, certain artifacts are created in the extreme highlights and shadows. These artifacts can detract from the quality of the image rather than enhancing it, especially for large edge enhancement factors. One possible solution to reducing such artifacts resulting from the edge enhancement algorithm is outlined in "New Edge-enhanced Error Diffusion Algorithm Based on the Error Sum Criterion" by Kim et al., Journal of Electronic Imaging 4(2), 172–178 (April 1995). The described method attempts to resolve these problems by analyzing an error sum to determine if an edge region includes such problem areas and, if so, adding a constant to the error.

Various apparatus and methods for generating images on a recording medium or otherwise with an error diffusion algorithm are described in the following disclosures which may be relevant to certain aspects of the present invention.

U.S. Pat. No. 5,045,952 to Eschbach, describes a method of dynamically adjusting the threshold level of an error diffusion algorithm to selectively control the amount of edge enhancement induced into an encoded output. The threshold level is selectively modified on a pixel-by-pixel basis.

U.S. Pat. No. 5,353,127 to Shiau et al. describes a method for quantizing gray level pixel data with an extended distribution set. Various schemes for distribution weightings of errors is disclosed.

U.S. Pat. No. 5,375,002 to Kim et al. describes an error diffusion circuit and a method for adaptively compensating for the distortion of brightness in color with respect to neighboring pixels. An error diffusion circuit includes a color determining portion for adding CMY signals to a diffusion error to generate a current pixel value, comparing the current pixel value with sequentially supplied error lookup data to determine an address of error lookup data having the smallest error as output pixel color information, and applying the output pixel color information to the printer.

U.S. Pat. No. 5,434,672 to McGuire, describes a pixel error diffusion method. Error distribution in printing and information processing systems is accomplished according to combined internal and external superpixel error diffusion techniques. For a particular superpixel, the error amounts of a selected internal subject pixel are provided to another internal subject pixel until a determined or selected final pixel error value within the selected superpixel has been determined. The final internal error value is distributed among selected superpixels within a predetermined superpixel neighborhood.

"Threshold Modulation In Error Diffusion" by Knox and Eschbach, Journal of Electronic Imaging, July 1993, Volume 2, pages 185–192, describes a theoretical analysis of threshold modulation in error diffusion. Spatial modulation of the threshold is shown to be mathematically identical to processing an equivalent input image with a standard error diffusion algorithm.

SUMMARY OF THE INVENTION

In accordance with one aspect of the present invention, there is provided a method for converting an input image including a plurality of input pixels each having a first number of possible input levels of optical density to an output image including a plurality of output pixels each having a second number of possible output levels of optical density. The method includes the steps of generating a modified optical density value by adding an error value, if any, to the input level of one of the input pixels; generating a phantom output level as a function of the modified optical density level; determining the error value as a function of the selected phantom output level; and generating an output pixel having one of the output levels determined as a function of the modified optical density value.

Pursuant to another aspect of the present invention, there is provided a method of quantizing pixel values in an image formed by a plurality of pixels, each pixel representing an optical density of the image at a location therein, and having an original optical density value associated therewith selected from one of a set of m original optical density values, having a number of members. The method includes the steps of adding to an original density value of each pixel, an error signal resulting from quantization of previous pixels, if any, to derive a modified density value, and comparing the modified density value of a pixel with a threshold value to select an output value representing the pixel from a set of m possible density values, determining an error term as a function of the difference between a phantom output level value and the modified density value.

While the present invention will be described in connection with a preferred embodiment thereof, it will be understood that the present invention is not intended to limit the invention to the described embodiments. On the contrary, it is intended to cover all alternatives, modifications, and any equivalents as may be included in the spirit and scope of the invention as defined by the appended claims.

DETAILED DESCRIPTION OF THE DRAWINGS

Figure 1:
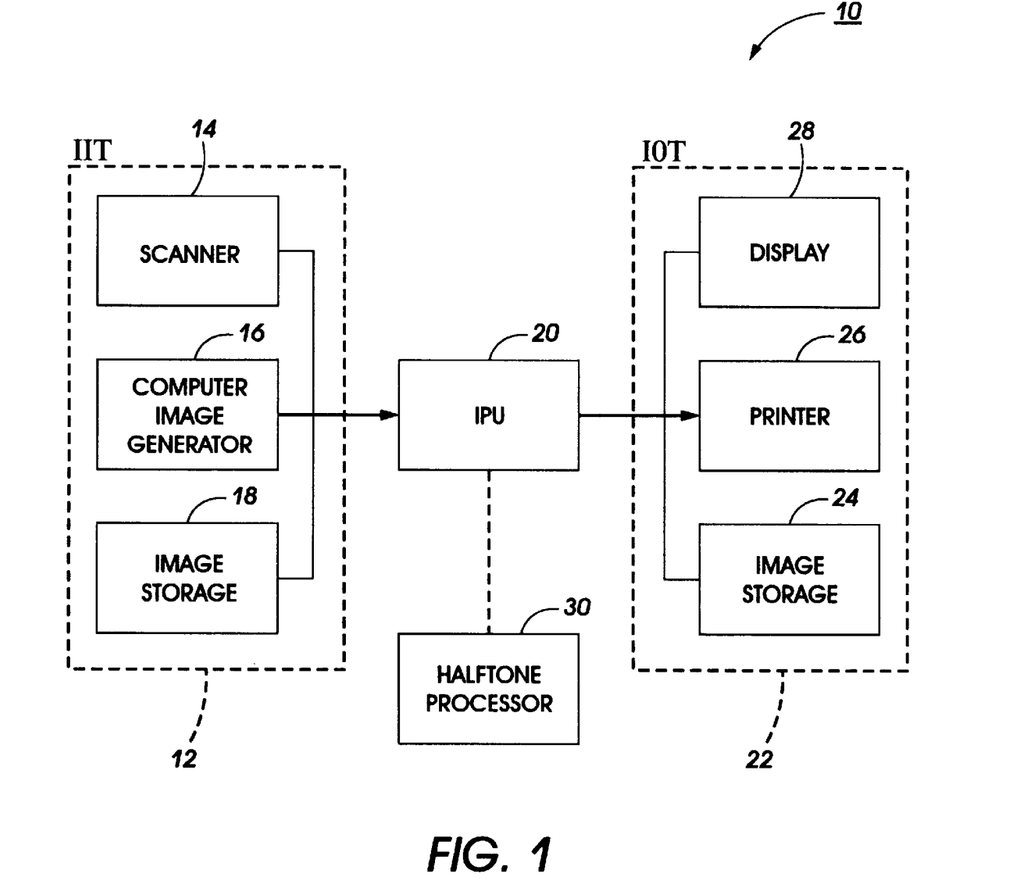
FIG. 1 is a simplified schematic block diagram illustrating an image producing system in which the present invention may be applied.

FIG. 1 illustrates a basic image processing system 10. In the system 10, an electronic representation of a document (hereinafter, an image), from an image input terminal 12 derives electronic digital data in some manner from an original image or other source, in a format related to the physical characteristics of the device typically including pixels divided at m bits per pixel. Typical image input terminals include a scanner 14, a computer image generator 16 and an image storage device 18. Common color scanners, such, for example, Xerox 5775 digital color copiers, or the Pixel Craft 7650 C, produce 8 bits per pixel data at resolutions acceptable for many purposes. The electronic digital data signals, transmitted through an image processing unit 20, are processed for suitable reproduction on an image output terminal 22 which can include an image storage device 24, a printer 26 and a display 28. The printer 26 can include many types of digital image generating printers including xerographic printers, and liquid ink printers, such as continuous stream or drop on demand including piezoelectric, acoustic, phase change wax based, or thermal. Likewise, the display 28, not only includes cathode ray tube types of displays but also LCD displays and other image displays. Image processing unit 20 includes a halftone processor 30 which converts m bit digital image signals to n bit digital image signals, suitable for reproduction by the image output terminal 22, where m and n are integer values.

As used herein, a "pixel" refers to an image signal associated with a particular position in an image having an optical density between a minimum and a maximum. Accordingly, pixels are defined by intensity and position. The pixels may refer to a particular position, region, or superpixel (collection of pixels) in the output image. In addition, the present invention applies equally to both monochrome and color systems where color documents are represented by multiple sets of image signals, each set (or separation) being represented by an independent channel which is usually processed independently. Each separation provides a set of image signals or separation pixels. These might be used to drive a printer to produce one color separation of the image. In the case of multi-color printers, these separations, superimposed together, form the color image. In this context, pixels are described as discrete image signals which represent optical density of the document image in a given small area (gray) as used herein does not refer to a color unless specifically identified as such to as the present invention is equally applicable to both monochrome and color spaces. Rather, the term refers to image signals which vary between maximum and minimum, irrespective of the color of the separation in which the signals are used. In addition, the present invention is not limited to a color space using cyan, magenta, yellow, and black but also other color spaces such as those including luminance, chroma, and hue wherein the present invention could be used to enhance the luminance signal or any other space or separation.

Before describing an embodiment of the invention, the principals of the invention will be discussed. In the inventive phantom level edge enhanced error diffusion process and circuit described herein, a monochrome or color image is processed using the edge enhanced error diffusion algorithm and apparatus as described in U.S. Pat. No. 5,045,952 to Eschbach, herein incorporated by reference. The Eschbach process, however, is modified according to the present invention to improve the edge enhancement capabilities thereof. It has been found that the Eschbach edge enhancement algorithm is particularly useful for ink jet images where the printing processes tend to remove edges due to the deposition of ink drops as well as the phenomenon of ink bleeding. The algorithm, as it exists, however, can generate undesirable artifacts which are created in the extreme highlights and shadows of an image which is to be reproduced. These artifacts can detract from the quality of the image rather than enhancing it, especially for large edge enhancement factors. The present invention, therefore, improves upon the Eschbach algorithm by including a number of phantom output levels which are used in the calculation of the error used to modify an input image signal.

The present invention is also applicable to any error diffusion algorithm and circuits where conversion errors are distributed to pixels. In addition, the present invention is applicable to image enhancement algorithms and circuits where the number of input levels is equal to the number of output levels but the image is enhanced through the manipulation of desired image attributes such as enhancement of an edge. In these types of systems, for example, the number of input levels might be 256 and the number of output levels would correspondingly be 256.

In the known error diffusion algorithms, the error is the difference between the gray value (0–255) of the original input digital gray scale image and the actual value which is printed white (0) or black (255). In the present invention, however, the error is determined to be the difference between the gray value (0–255) of the original input of digital gray scale image and an output value. This output value could be one of the possible output levels or it could be a phantom output level which cannot be printed. For example these phantom levels could be levels below 0 or above 255 which cannot be printed so levels 0 and 255 are printed instead respectively. Consequently, for the present invention, the standard diffusion algorithm, which is expressed in two equations is modified by the inclusion of these phantom levels. The first equation (Equation 1) is not modified where the output image pixels b (m,n), are defined as:

$$b(m,n) = \text{step}[i(m,n) - \Sigma a_{j,k} e(m-j, n-k) - t] \qquad \text{Equation 1}$$

where i equals the image input pixel.

The second equation (Equation 2) is modified by the inclusion of the phantom output levels. For printable levels e(m,n) equals o(m,n) but for phantom levels o(m,n) equals the nearest printable level (usually 0 or 255). e (m,n) describes the errors made in the threshold process as follows:

$$e(m,n) = o(m,n) - [i(m,n) - \Sigma a_{jk} e(m-j, n-k)] \qquad \text{Equation 2}$$

where o(m,n) is equal to a phantom output level when the threshold plus error is less than 0 or greater than 255 and where o(m,n) is equal to a printable output level, such as 0 or 255 (in a binary system) if the threshold plus error is between 0 and 255.

By modifying Equation 2 in this fashion, artifacts of the edge enhancement Eschbach algorithm are substantially reduced.

Phantom levels are levels that lie outside the range of the n possible output levels. These levels are used only for the error calculation as only the nearest possible output level are actually printed or displayed. The method includes the steps of generating a modified optical density value by adding an error value, if any, to the input level of one of the input pixels, adjusting the threshold based on the input pixel level, determining the error value as a function of the modified optical density level and the threshold, and generating an output level as a function of the modified optical density level and the threshold.

Figure 2:
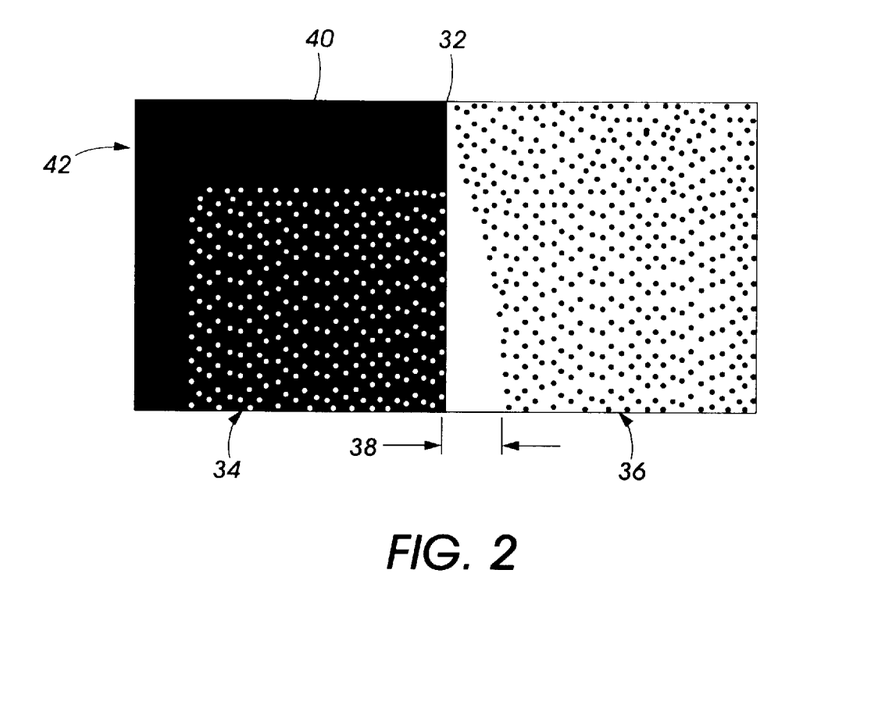
FIG. 2 illustrates an expanded image showing an artifact resulting from the prior art edge enhanced error diffusion algorithm.
Figure 3:
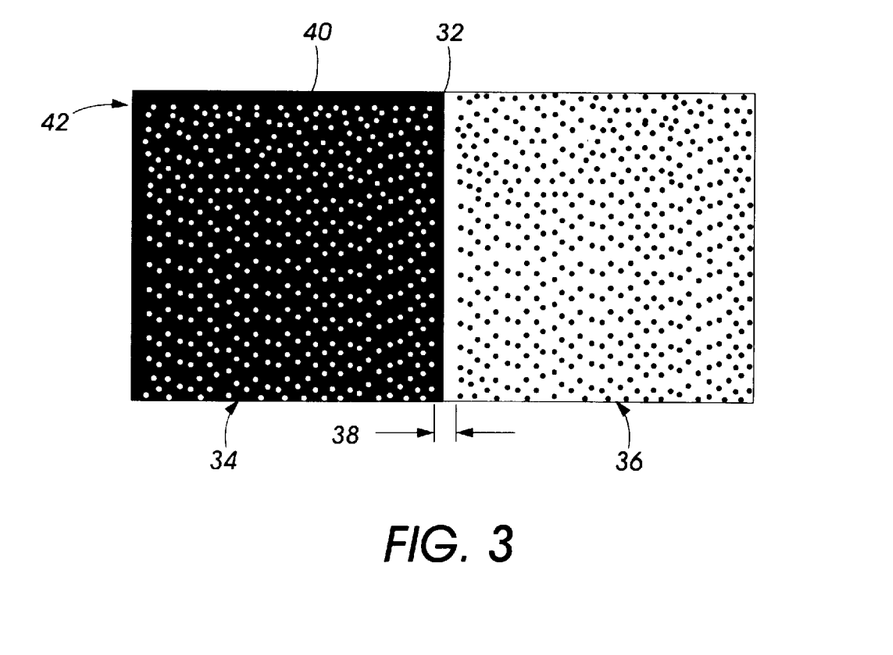
FIG. 3 illustrates an expanded image showing the reduction of edge enhanced artifacts using the process and apparatus of the present invention.

FIG. 2 illustrates a representative portion of an image as might be is printed according to the edge enhancement process outlined in the Eschbach patent. As can be seen, the Eschbach process creates an artifact when transitioning between an edge 32 occurring between a dark gray (level 253) portion of the image 34 to a light gray portion (level 8) of the image 36. The dark gray portion is formed by printing mostly black with some areas left unprinted showing white. The light gray portion is formed by sparsely depositing black on white. At the edge 32, or boundary therebetween, the density of light pixels will be decreased on the dark side of the edge and/or the number of dark pixels will be decreased on the light side thus enhancing the effect of the edge. The problem occurs for very light or dark regions there are only a small number of pixels to be decreased The edge region includes areas of full black and full white; for instance, white paper 100% covered with black ink and white paper left unprinted. If such an area becomes too large it does not appear as an enhanced edge but as white or black region adjacent to an edge. This artifact can also appear at an edge 40 of the document where a large artifact region 42 of black is apparent. The same representative portion of the image, however, as illustrated in FIG. 3, using phantom levels of the present invention, shows a substantially reduced edge region 38 as well as a substantially reduced edge region 42.

Figure 4:
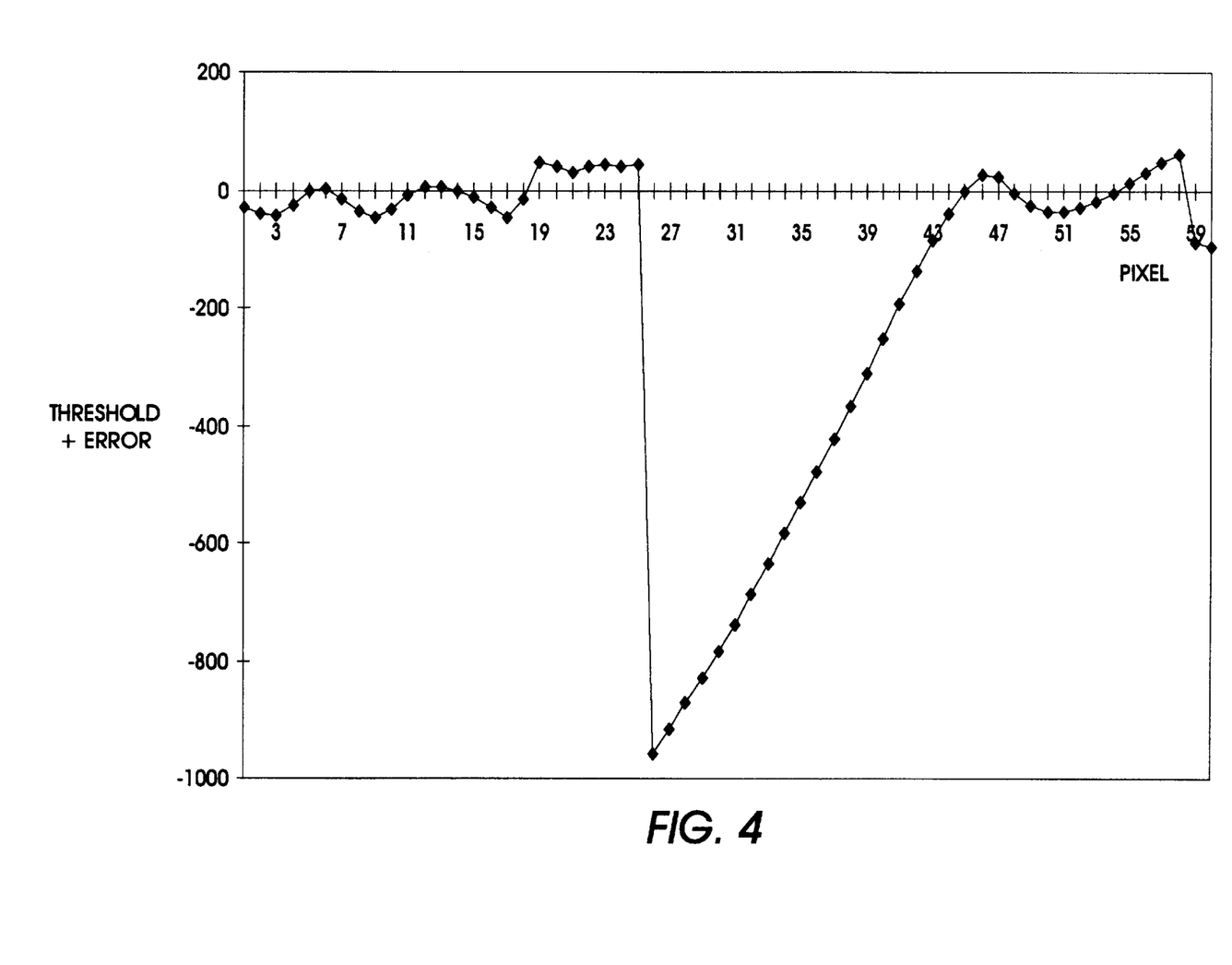
FIG. 4 illustrates a graph of an example of an error plus threshold value versus pixel locations without the use of phantom levels illustrating a large artifact region.

FIG. 4 illustrates a graph of the threshold plus error versus pixel location by pixel number without the use of phantom levels. As can be seen, the area between approximately pixel location twenty-five to pixel location forty-five has a region where the threshold plus error is less than zero. This region would be printed as an area of white, such as the area 38 of FIG. 2. In this region the error values are not compensated rapidly enough for the change in threshold at the edge and thus cause the illustrated artifact.

Figure 5:
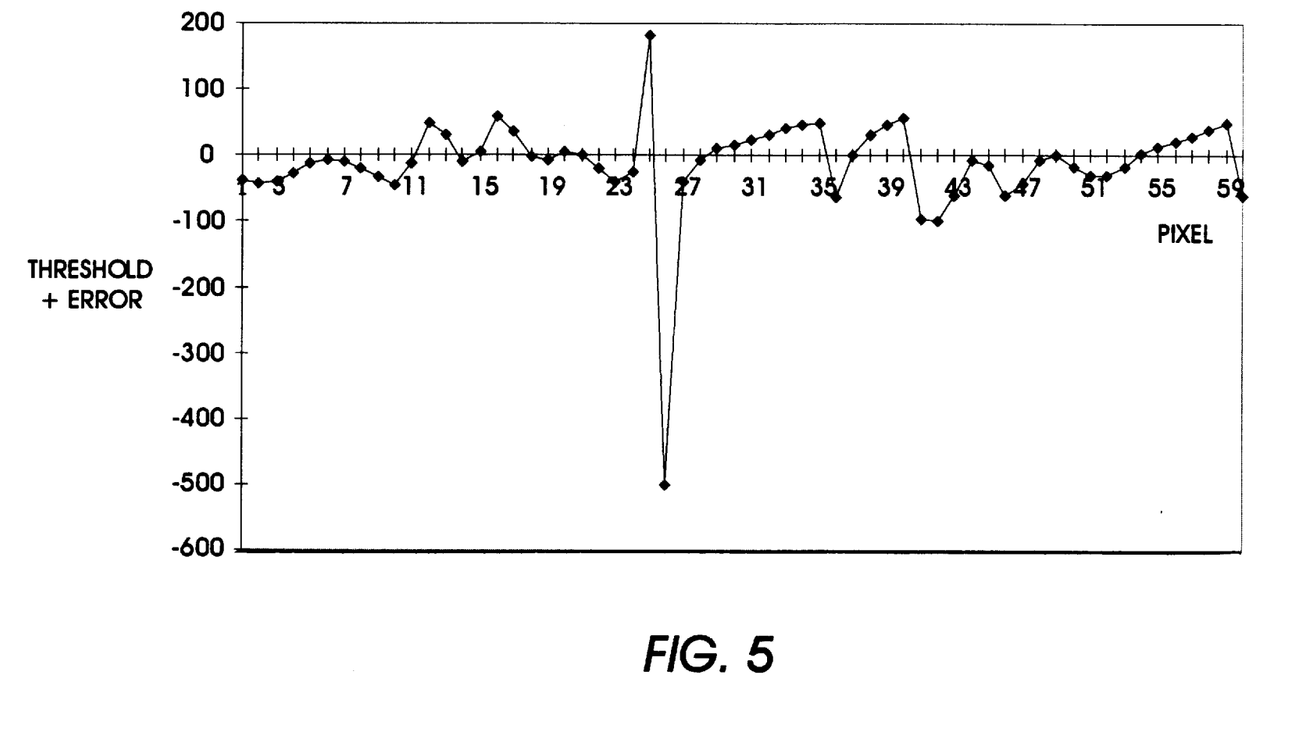
FIG. 5 illustrates a graph of an example of an error plus threshold value versus pixel locations for the present invention using phantom levels.

FIG. 5, however, illustrates a graph of the threshold plus error versus pixel location by pixel number using phantom levels. As can be seen, the area between approximately pixel location 25 to 27 includes a region where the threshold plus error is less than zero. This region is printed as an area of white, such as the area 38 of FIG. 3. As can be seen, use of the phantom levels reduces the amount of artifact present in the printed image. This area, in some cases, including the illustrated examples can be significantly reduced. It also important to note that the present invention does not include any additional steps of modifying the error signal, such as by clipping of the error function.

Figure 6:
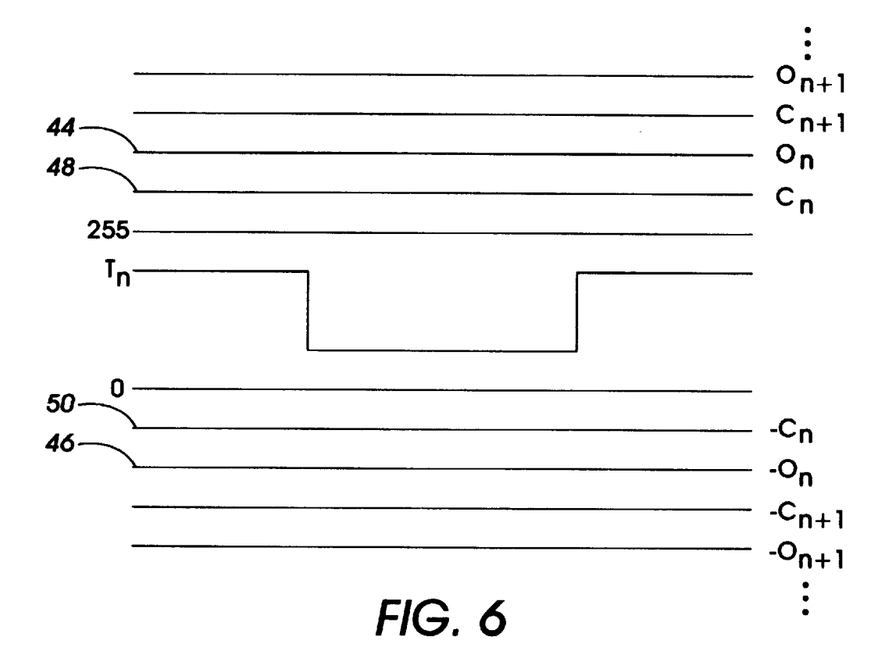
FIG. 6 illustrates a modified threshold level $T_n$ as well as clipping levels $C_n$ and phantom output levels $O_n$ of the present invention.

In practice, each of the phantom levels is associated with a clipping level. For instance, as illustrated in FIG. 6, there are a plurality of phantom levels $O_n$ and a plurality of clipping levels $C_n$. As can be seen, a modified threshold level $T_n$ varies between a value of 0 up to 255 for thresholding the input pixels. The phantom output levels $O_n$ as well as the clipping levels $C_n$, however, are set at levels which appear outside the normal range of possible levels, that is above and below 0–255, such that the phantom levels and clipping levels improve the process of edge enhancement by reducing artifacts without adding additional processing steps. These clipping levels and phantom levels are used for the calculation of the error while the levels of 0 and 255 are used as output levels in this binary printing example.

In the present invention, however, a clipping level $C_n$ is set greater than the value of 255 (or less than 0) such that any input image signals plus errors accumulating to the point of being greater than the clipping level $C_n$ cause a predetermined phantom output level $O_n$ to be selected. The phantom output level $O_n$ is then subtracted from the modified image instead of subtracting the printed output level of 255 (or zero). The phantom output levels are not printed or displayed, but are instead used only for the error calculation thereby causing the error sum to self correct in the regions that normally produce artifacts. Consequently, if the threshold plus error sum exceeds the level of 255 or falls below the level of 0, output levels of 255 or 0, respectively, are still printed. In this embodiment, the clipping levels and the phantom levels are used only in the calculation of the error.

Whereas the clipping levels $C_n$ are usually placed half way between real levels, the clipping levels are preferentially placed nearer to the phantom levels. This prevents large movements of the error function within the range of printable levels which would appear as noise within the printed image. In one embodiment, the real levels are 0 and 255 and the phantom output levels are –32, –64, ... and 287, 319, ... up to some minimum and maximum which would depend on the edge enhancement factor. The clipping levels in this case could be set at ..., –56, –24, 128, 279, 311. ... These levels can be used in the binary printing process such as the case of an ink jet printer. The present invention, however, applies equally well to multiple level error diffusion as well as to binary error diffusion and would include multiple real output levels as well as multiple phantom output levels. Multiple level error diffusion can be used in various xerographic printers as well as acoustic ink jet printing having more than two levels of output.

Figure 7:
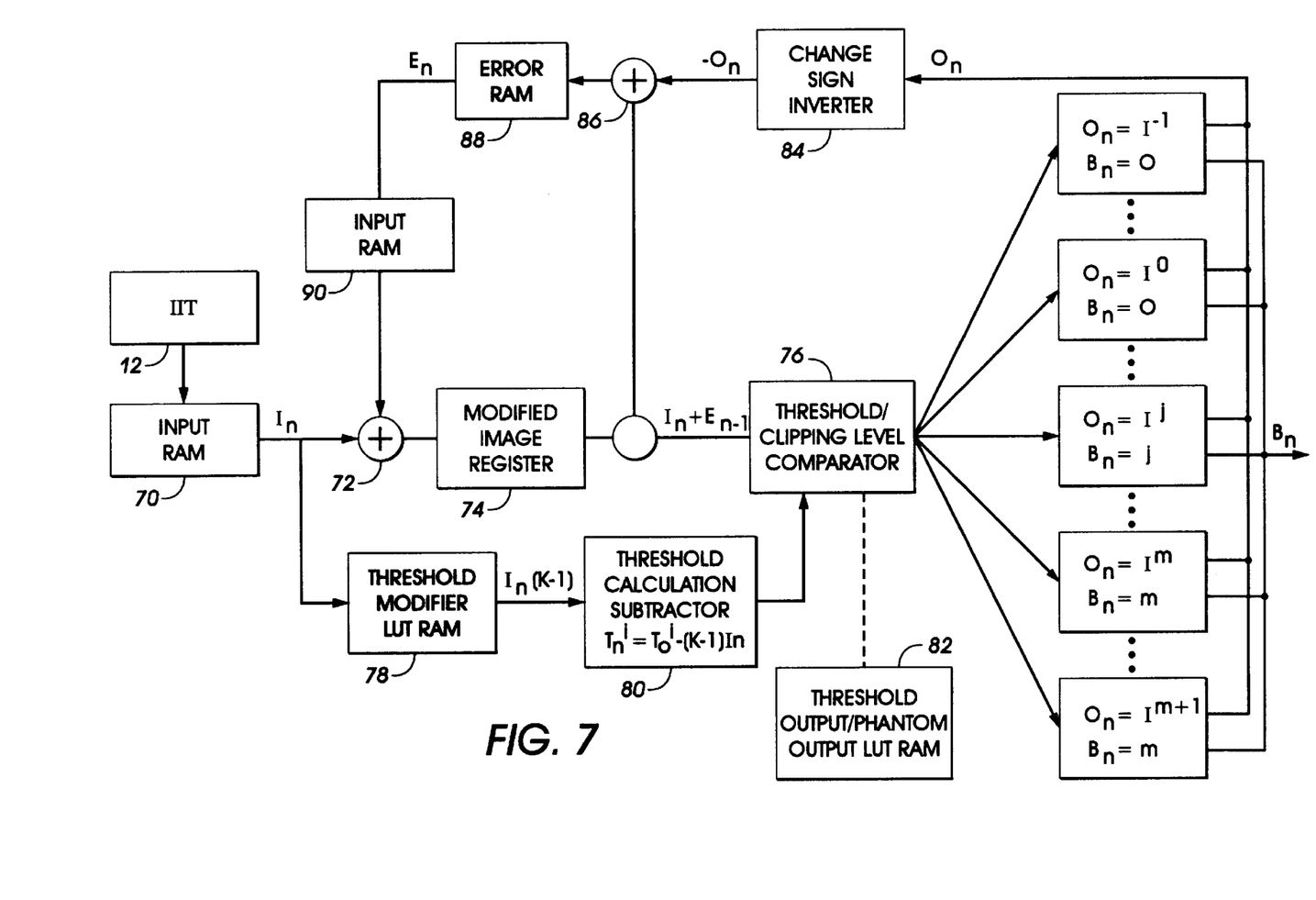
FIG. 7 illustrates a phantom level edge enhanced error diffusion circuit of the present invention.

FIG. 7 illustrates a phantom output level edge enhanced error diffusion circuit of the present invention. The circuit of FIG. 7 is incorporated into the halftone processor 30 of FIG. 1. The halftone processor of FIG. 1 can either be a dedicated hardware circuit using standard logic circuits or a single chip using VLSI designs. More likely, however, the circuit of FIG. 7 may be implemented in a microprocessor including the appropriate software control programmed according to well known practices. It is commonplace to program and execute error control diffusion algorithms with software instructions for conventional or general purpose microprocessors. This is taught by various prior patents and commercial products. Such programming or software may, of course, vary depending on the particular functions, software type, and microprocessor or other computer system utilized but will be available to, or readily programmable, without undue experimentation from functional descriptions such as those provided herein or with prior knowledge of functions which are conventional together with general knowledge in the software and computer arts. Such software can include object oriented software development environments, such as C++.

The image input terminal 12 transmits a signal to an input random access memory (RAM) 70 which stores portions of or one or more complete full page image bitmaps. The input RAM is addressed to introduce the input digital image signal $I_n$ into the circuit on a pixel-by-pixel basis. Each input pixel has its corresponding error $E_{n-1}$ added to the input value at an adder 72. The modified image is temporarily stored in a modified image register 74. The modified image $I_n + E_{n-1}$ is transferred to a threshold/clipping level comparator 76. A modified threshold level, $T_n$ is determined by first calculating a modifier based on the input value $I_n$ of each pixel as represented by a threshold modifier lookup table 78 stored in RAM or some other data storage device. Values of input levels $I_n$ as well as corresponding threshold modifiers (K-1) are stored in the lookup table 78 and are selected in response to the value of the input $I_n$. The modified $I_n$ (K-1) is then subtracted from the nominal threshold value $T_o$ in a threshold calculation subtractor 80 to determine the threshold value $T_n$ to be applied at the threshold/clipping level comparator 76.

The modified image value $I_n + E_{n-1}$ is compared to the modified threshold level $T_n$ to determine the appropriate output level $B_n$ which is stored in a threshold output/phantom output lookup table 82 stored in RAM or some other data storage device. This comparison determines the output level $B_n$, which is to be transmitted to the image output terminal 22 of FIG. 1. In addition, the threshold/clipping level comparator 76 also determines the appropriate error level corresponding to the modified image value $I_n + E_{n-1}$ to be used for the error calculation. As described earlier, the two levels, one for the output and one for the error calculation are the same for real levels but differ for phantom levels.

When the modified image, $I_n + E_{n-1}$ exceeds a clipping level $C_n$ for a phantom level then the corresponding phantom output $O_n$ level is selected and transmitted to the change sign inverter 84. The phantom output level is subtracted from the modified image value to determine the error level for the subsequent input pixel. The subtraction operation occurs due to the sign inversion performed by the change sign inverter and the adder 86, the value of which is stored in the error RAM 88. A delay buffer 90 generates a single pixel delay to store the error value in a 1 dimensional situation. In a multidimensional situation, the error value is split and distributed according to a distribution scheme among adjacent and nearby pixels as is known in the art.

The comparator 76 can provide not only a single clipping level and associated phantom output level but many clipping levels and associated phantom output levels for mutli level devices or for super pixel applications. In these instances the clipping level selected is that which exceeds a certain clipping level but does not exceed the next highest clipping level. For instance, as illustrated in FIG. 5, modified image 58 exceed the clipping level 48 but not the clipping level 92 such that the phantom level 44 is selected for determining the error as opposed to selecting the phantom level 94.

While the embodiments disclosed herein are preferred, it will be appreciated from this teaching that various alternatives, modifications, variations or improvements therein may be made by those skilled in the art, which are intended to be encompassed by the following claims. For instance, the present invention is not limited to only copying machines and printing machines of all types but also includes display devices such as cathode ray tube, light emitting diode displays, liquid crystal displays, and any display displaying images using multi-level output pixels. In addition, the present invention, is not limited to error diffusion, but to other image processing methods and apparatus which use feedback and thresholding to alter an image. Furthermore, the phantom values can be of any value as long as the phantom values are non-printable or non-displayable Accordingly, the present invention is intended to embrace all such alternatives, modifications, and variations that fall within the spirit and broad scope of the appended claims.

What is claimed is:

1. A method for converting an input image including a plurality of input pixels each having a first number of possible input levels of optical density to an output image including a plurality of output pixels each having a second number of possible output levels of optical density, a set of output levels corresponding to an operative range of an output device, comprising:
   generating a modified optical density value by adding an error value, if any, to the input level of one of the input pixels;
   generating a phantom output level as a function of the modified optical density level, the phantom output level corresponding to an output level beyond the operative range of the output device;
   determining the error value as a function of the selected phantom output level; and
   generating an output pixel having one of the output levels determined as a function of the modified optical density value.

2. The method of claim 1, wherein said second mentioned generating step comprises generating the phantom output level by comparing the modified optical density value to a clipping level.

3. The method of claim 2, wherein said second mentioned generating step comprises generating the clipping level to be greater than the largest of the m possible input levels of optical density.

4. The method of claim 3, wherein said second mentioned generating step comprises generating the clipping level to be less than the smallest of the m input levels of optical density.

5. The method of claim 1, wherein said third mentioned generating step comprises generating the output pixel by comparing the modified optical density value to a threshold level.

6. The method of claim 1, wherein the phantom level comprises a non-printable or non-displayable level.

7. The method of claim 6, wherein the first number of possible input levels is equal to the second number of possible output levels.

8. The method of claim 6, wherein the first number of possible input A levels is greater than the second number of possible output levels.

9. A method for converting an input image including a plurality of input pixels each having a first number of possible input levels of optical density to an output image including a plurality of output pixels each having a second number of possible output levels of optical density, comprising:
   generating a modified optical density value by adding an error value if any, to the input level of one of the input pixels;
   generating a phantom output level as a function of the modified optical density level;
   determining the error value as a function of the selected phantom output level; and
   generating an output pixel having one of the output levels determined as a function of the modified optical density value, wherein said generating step comprises generating the phantom output level by comparing the modified optical density value to a clipping level, generating the clipping level to be greater than the largest of the m possible input levels of optical density or less than the smallest of the m input levels of optical density, and generating the phantom output level to be greater than the selected clipping level which is greater than the largest of the m possible input levels of optical density.

10. The method of claim 9, wherein said second mentioned generating step comprises generating the phantom output level to be less than the clipping level which is less than the smallest of the m possible input levels of the optical density.

11. The method of claim 10, wherein said second mentioned generating step comprises generating the phantom output level from one of a plurality of phantom output levels.

12. The method of claim 11, wherein said second mentioned generating step comprises generating the phantom output level by comparing the modified optical density value to the clipping level selected from one of a plurality of clipping levels.

13. The method of claim 12, wherein said second mentioned generating step comprises generating the phantom output level from one of the plurality of phantom output levels, each of the plurality of phantom output levels being associated with one of the plurality of clipping levels.

14. The method of claim 11, wherein said third mentioned generating step comprises generating the output pixel to have an output level less than the selected phantom output level.

15. A method of quantizing pixel values in an image formed by a plurality of pixels, each pixel representing an optical density of the image at a location therein, and having an original optical density value associated therewith selected from one of a set of original optical density values, having a number of members n larger than a desired output set of optical density values, the output set of optical density values corresponding to an operative range of an output device, comprising:
   adding to an original density value of each pixel, an error signal resulting from quantization of previous pixels, if any, to derive a modified density value;
   determining an error term as a function of the difference between a phantom output level value and the modified density value, the phantom output level value corresponding to an output optical density value beyond the operative range of the output device; and comparing the modified density value of a pixel with a threshold value to select an output value representing the pixel from a set of m possible density values.

16. The method of claim 15, wherein said determining step comprises determining the phantom output level by comparing the modified optical density value to a clipping level.

17. The method of claim 16, wherein said determining step comprises determining the clipping level to be greater than the largest of the m possible input levels of optical density.

18. The method of claim 17, wherein determining step comprises determining the clipping level to be less than the smallest of the m input levels of optical density.

19. A method of quantizing pixel values in an image is formed by a plurality of pixels, each pixel representing an optical density of the image at a location therein, and having an original optical density value associated therewith selected from one of a set of original optical density values, having a number of members n larger than a desired output set of optical density values, comprising:

adding to an original density value of each pixel, an error signal resulting from quantization of previous pixels, if any, to derive a modified density value;

determining an error term as a function of the difference between a phantom output level value and the modified density value wherein said step comprises determining the phantom output level by comparing the modified optical density value to a clipping level, determining the clipping level to be greater than the largest of the m possible input levels of optical density or less than the smallest of the m input levels of optical density, and determining the phantom output level to be greater than the determined clipping level which is greater than the largest of the m possible input levels of optical density; and comparing the modified density value of a pixel with a threshold value to select an output value representing the pixel from a set of m possible density values.

20. The method of claim 19, wherein said determining step comprises determining the phantom output level to be less than the clipping level which is less than the smallest of the m possible input levels of the optical density.

21. The method of claim 20, wherein determining step comprises generating the phantom output level from one of a plurality of phantom output levels.

22. The method of claim 21, wherein said determining step comprises determining the phantom output level by comparing the modified optical density value to the clipping level selected from one of a plurality of clipping levels.

23. The method of claim 22, wherein said determining step comprises determining the phantom output level from one of the plurality of phantom output levels, each of the plurality of phantom output levels being associated with one of the plurality of clipping levels.

* * * * *